United States Patent
Eggleton et al.

[11] 3,763,948
[45] Oct. 9, 1973

[54] FOUR WHEEL DRIVE TRACTORS

[75] Inventors: Geoffrey Donald Eggleton; Eric Douglas Jones, both of Hampshire, England

[73] Assignee: County Commercial Cars Limited, Hampshire, England

[22] Filed: Nov. 19, 1971

[21] Appl. No.: 200,378

[30] Foreign Application Priority Data
Feb. 26, 1971  Great Britain..................... 5,571/71

[52] U.S. Cl. ............................. 180/44 R, 74/606 R
[51] Int. Cl. ........................................... B60k 17/34
[58] Field of Search............. 180/44 M, 44 R, 44 F, 180/45, 53 B, 53 D, 53 CD, 24.1; 74/606 R

[56] References Cited
UNITED STATES PATENTS

| | | | |
|---|---|---|---|
| 2,173,044 | 9/1939 | Ruggles et al..................... | 180/44 R |
| 2,228,581 | 1/1941 | Olen................................. | 180/44 R |
| 3,522,861 | 8/1970 | Middlesworth .................. | 180/44 R |
| 3,095,758 | 7/1963 | Bixby................................ | 180/44 R |

Primary Examiner—Gerald M. Forlenza
Assistant Examiner—Richard A. Bertsch
Attorney—Irvin S. Thompson et al.

[57] ABSTRACT

A four wheel drive tractor has two steerable wheels and two non-steerable wheels; a footplate; a change speed gear unit arranged in a casing the unit having an upper drive shaft for transmission of torque to the non-steerable wheels; a spur gear rotatable with the said shaft and slidable therealong to engage other gears in the gear unit; an aperture in the gear unit casing adjacent the said spur gear; a housing mounted on the said casing, surrounding the said aperture and extending outwardly and downwardly of the casing to a point below the level of the footplate; a gear wheel mounted within said casing and engaging said spur gear, said gear wheel being of such a width that it is permanently in mesh with the said spur gear during sliding movement of said spur gear along said drive shaft; further gear wheels within the casing forming with said gear wheel a compound gear train extending downwardly below the level of the footplate; and means for transmitting torque from the lower end of the gear train to said two steerable wheels.

7 Claims, 7 Drawing Figures

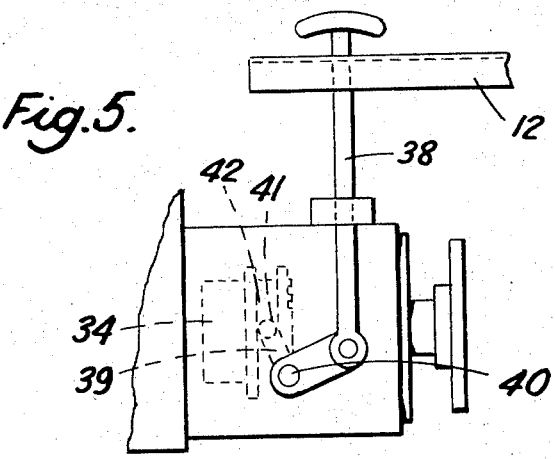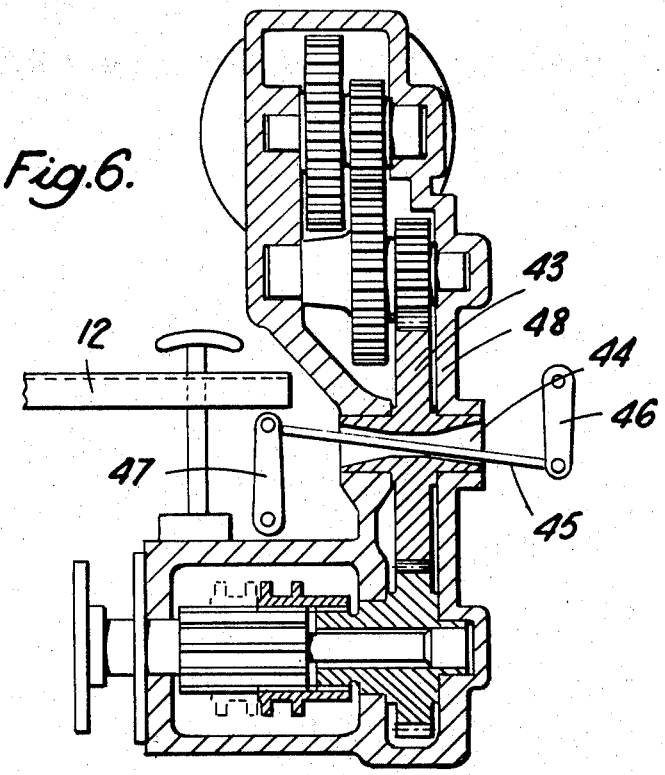

FOUR WHEEL DRIVE TRACTORS

The invention relates to four wheel drive tractors, and particularly to four wheel drive tractors of the kind in which one pair of driving wheels are steerable and the other pair are non-steerable. Such tractors may be produced for example from a basic design for a two wheel drive tractor by modifying the basic design or by converting an existing two wheel drive tractor.

The invention provides a four wheel drive tractor of the kind having two steerable wheels, two non-steerable wheels, a footplate, and a change speed gear unit arranged in a casing, the unit having an upper drive shaft for transmission of torque to the non-steerable wheels, the drive shaft carrying a spur gear rotatable with the shaft and slidable therealong to engage other gears in the gear unit, in which the gear unit casing has an aperture in one side adjacent the spur gear; the gear unit casing has a housing mounted thereon, surrounding the said aperture and extending outwardly and downwardly of the casing to a point below the level of the foot plate, and the housing contains a compound gear train extending downwardly below the level of the footplate and including a gear wheel engaging the said spur gear, the gear wheel being of such a width that it is permanently in mesh with the said spur gear during sliding movement of the spur gear, and the tractor including means for transmitting torque from the lower end of the gear train to the two steerable wheels.

There may be a passageway extending through the said housing longitudinally of the tractor for passage of a linkage (e.g. a brake linkage).

Preferably the passageway leads through an aperture extending axially through the centre of a gear of the said gear train.

The means for transmitting torque from the gear train to the two steerable wheels may comprise hydraulic means, for example a hydraulic pump arranged to be driven by the gear train and arranged in turn to drive one or more hydraulic motors associated with the steerable wheels.

The means for transmitting torque from the gear train to the two steerable wheels may include a clutch arranged in the said housing at the lower end of the gear train.

A tractor according to the invention may be constructed by converting a two-wheel drive tractor without increasing the length of the tractor or altering the existing power transmission.

The invention is particularly applicable to a tractor in which a gear unit and rear transmission are contained in one housing thus making it impossible to interpose an additional "sandwhich" gear box between the output shaft of the gear unit and the rear transmission.

When the tractor is constructed by converting a two-wheel drive tractor there may exist in the gear unit casing of the two-wheel drive tractor an aperture in one side of the casing. If an aperture does not exist one may be cut or otherwise formed.

By way of example two specific embodiments of the invention will now be described, with reference to the accompanying drawings, in which:

FIG. 5 is a view on arrow 5 of FIG. 2;

FIG. 6 is a view corresponding to FIG. 3 of an alternative embodiment of gear train.

Figure 1:
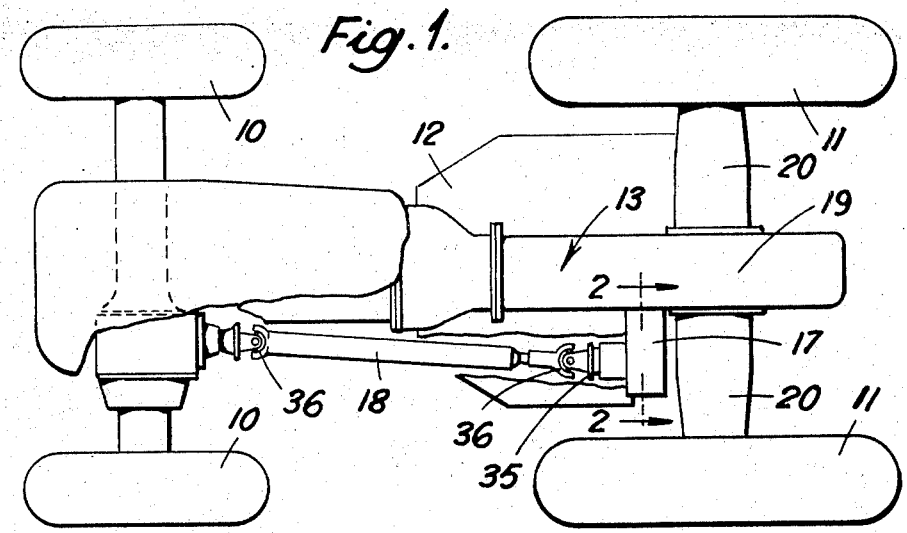
FIG. 1 is a diagrammatic plan view of one embodiment of a tractor according to the invention.
Figure 2:
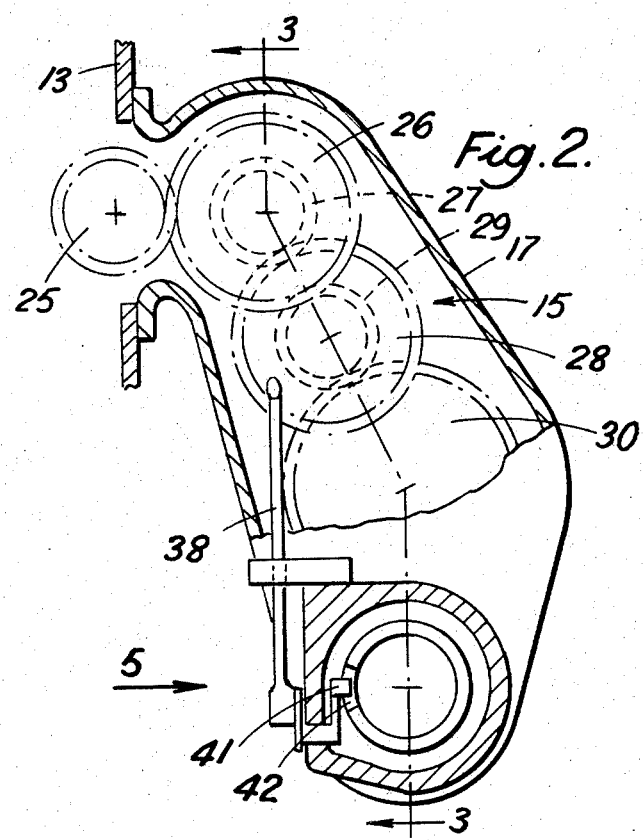
FIG. 2 is a section on the line II—II of FIG. 1, showing a gear train.
Figure 3:
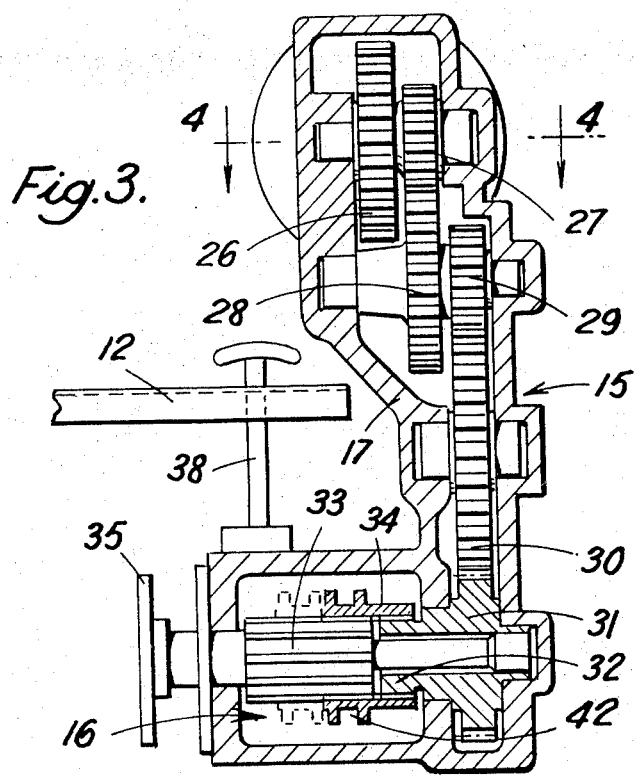
FIG. 3 is a section on the line III—III of FIG. 2.

The tractor shown in FIGS. 1 to 5 has two front steerable wheels 10, two rear non-steerable wheels 11, a footplate 12, a change speed gear unit in a casing 13, a gear train 15 and clutch 16 mounted in a housing 17, and a telescopic propeller shaft 18.

The gear unit casing is integral with the casing 19 housing the rear transmission.

The engine and the rear axle housings 20, are formed as rigid units, the units being bolted onto the integral casing housing the gear unit and rear transmission unit to form a single rigid assembly.

Figure 4:
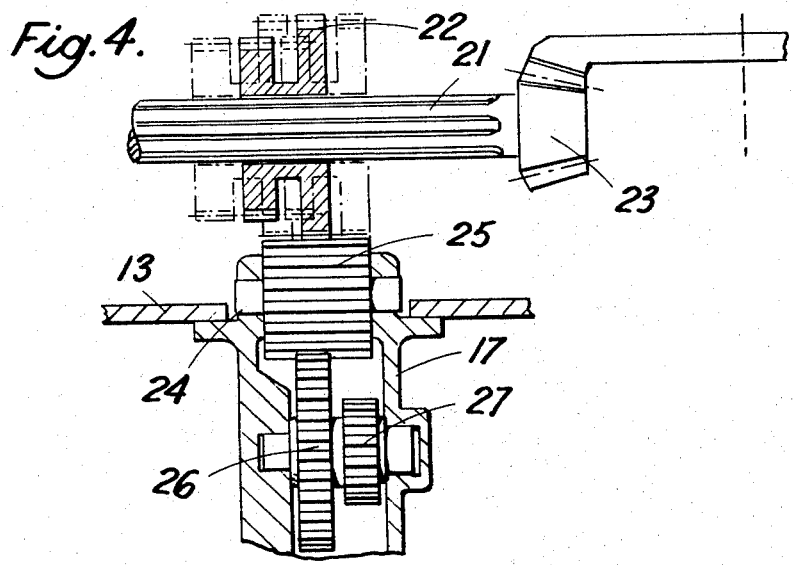
FIG. 4 is a section on the line IV—IV of FIG. 3 showing the drive shaft and spur gear.

Part of the gear unit casing 13 is shown in FIG. 4. The output shaft of the unit is the upper shaft 21. The shaft 21 is splined and carries a spur gear 22 rotatable therewith but slidable therealong to mesh with other gears, not shown, to vary the speed of rotation of the output shaft. The shaft 21 delivers torque to the rear wheels 11 in a conventional manner via an integral gear wheel 23, and the speed of rotation of the shaft 21 is proportional to the ground speed of the vehicle.

The gear casing 13 has an aperture 24 (FIG. 4) in one side thereof and projecting into this aperture to engage gear 22 is the gear train 15 and its housing 17.

The gear train 15 comprises a wide spur gear 25 meshing with gear 22, a first pair of compound gears 26, 27, a second pair of compound gears 28, 29 and two simple gears 30, 31. The width of gear 25 is such that it is permanently in mesh with gear 22, regardless of the positioning of gear 22 along the output shaft 21.

The gear 31 has a splined end 32 and is mounted with its axis collinear with a splined shaft 33 which shaft 33 is connected for rotation with the propeller shaft 18 via a flanged portion 35. An internally splined sleeve 34 is slidable on the splined shaft 33 and may be slid into the position shown in FIG. 3 to rotationally lock the shaft 33 to the gear 31. The shaft 33 and sleeve 34 comprise the clutch 16.

The propeller shaft 18 includes two universal joints 36 and is arranged to transmit torque from the clutch 16 to the front wheels 10 via a differential (not shown) arranged in a housing 37.

The clutch 16 is operated via a pull rod 38. The rod 38 is pivoted to a bell crank lever 39, which lever is pivotally mounted at 40. The bell crank lever carries a peg 41 which engages in a groove 42 in the sleeve 34. Thus pulling rod 38 wil engage the clutch and cause torque to be transmitted to the front wheels, while pushing the rod 38 will disengage the clutch.

The ratios of the gears of the gear train are chosen to give an appropriate speed of rotation to the propeller shaft 18.

In a tractor such as one having the form described above in which torque is transmitted to the steerable wheels via a gear train which extends from the gear unit of the tractor to one side of the tractor the gear train may form an obstacle, for example to linkages for controls which linkages may pass from front to rear of the tractor, and this may be particularly so when a two wheel drive tractor is converted to a four wheel drive tractor.

FIG. 6 shows one way in which a passage may be provided for a linkage through a gear train. The gear train is identical to that shown in FIG. 3 with the exception of the gear 30 and the casing 17. Instead of the gear 30 there is a gear 43 with an integral shaft having a passageway 44 extending axially therethrough, and where the gear 43 is mounted in the casing 48 the casing is cut away so that the passageway 44 is accessible. A member 45 of a brake linkage is shown passing through the passageway. The member 45 comprises a push pull rod connecting two levers 46, 47.

Figure 7:
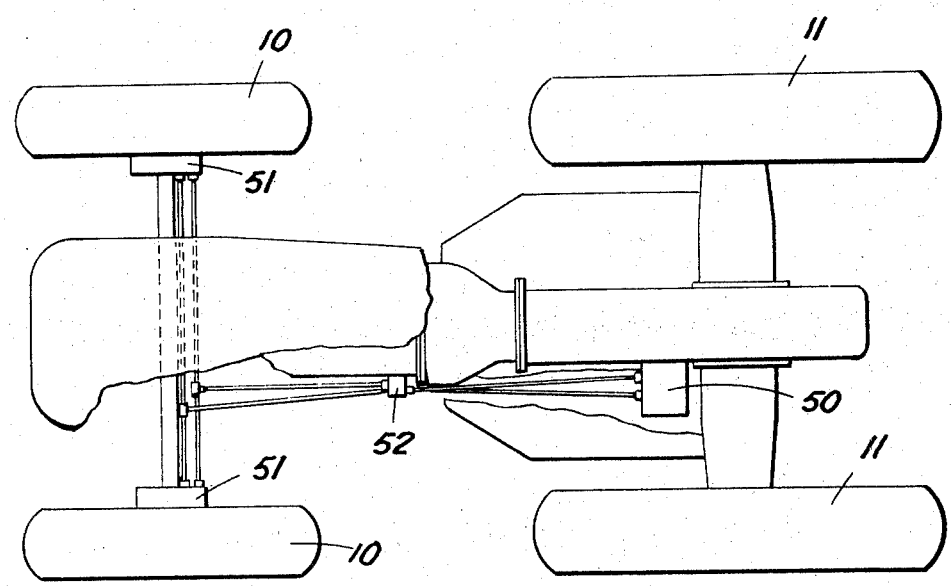
FIG. 7 is a view corresponding to FIG. 1 of an alternative tractor.

In the tractor shown in FIG. 7 the clutch 35, universal joints 36 and shaft 18 are replaced by a hydraulic pump 50 mounted below the level of the footplate and two hydraulic motors 51. The motors 51 are driven by the pump 50 and they in turn drive the two wheels 10 respectively. Drive to the wheels 10 may be controlled (e.g. interrupted by disconnecting the motors 51 and allowing pump 50 to run on open circuit) by valve means 52.

The invention is not restricted to the features of the foregoing embodiments. For instance, although the steerable wheels are the front wheels in the embodiments, the steerable wheels may be the rear wheels.

We claim:

1. A four wheel drive tractor having:
  a. a pair of steerable wheels and a pair of non-steerable wheels;
  b. a footplate;
  c. a change speed gear unit arranged in a casing the unit having an upper drive shaft for transmission of torque to one of said pairs of wheels;
  d. a spur gear rotatable with the said shaft and slidable therealong to engage different gears in the gear unit, said different gears being axially spaced relatively to said shaft;
  e. an aperture in the gear unit casing adjacent the said spur gear;
  f. a housing mounted on the said casing, surrounding the said aperture and extending outwardly and downwardly of the casing to a point below the level of the footplate;
  g. a gear wheel mounted within said casing and engaging said spur gear, said gear wheel being of such a width that it is permanently in mesh with the said spur gear during sliding movement of said spur gear along said drive shaft irrespective of which of said different gears of the gear unit is in mesh with said spur gear;
  h. further gear wheels within the housing forming with said gear wheel a compound gear train extending downwardly below the level of the footplate; and
  i. means for transmitting torque from the lower end of the gear train to the other of said pairs of wheels.

2. A four wheel drive tractor as claimed in claim 1, in which there is a passageway extending through the said housing longitudinally of the tractor for passage of a linkage (e.g. a brake linkage).

3. A four wheel drive tractor as claimed in claim 2 in which the passageway leads through an aperture extending axially through the centre of a gear wheel of the said gear train.

4. A four wheel drive tractor as claimed in claim 1 in which the means for transmitting torque from the gear train to the other of said pairs of wheels comprises hydraulic means.

5. A four wheel drive tractor as claimed in claim 4 in which the hydraulic means comprises a hydraulic pump arranged to be driven by the gear train and arranged in turn to drive one or more hydraulic motors associated with the other of said pairs of wheels.

6. A four wheel drive tractor as claimed in claim 1 in which the means for transmitting torque from the gear train to the other of said pairs of wheels includes a clutch mounted in the said housing at the lower end of the gear train.

7. A four wheel drive tractor having:
  a. two steerable wheels and two non-steerable wheels;
  b. a footplate;
  c. a change speed gear unit arranged in a casing the unit having an upper drive shaft for transmission of torque to the non-steerable wheels;
  d. a spur gear rotatable with the said shaft and slidable therealong to engage other gears in the gear unit;
  e. an aperture in the gear unit casing adjacent the said spur gear;
  f. a housing mounted on the said casing, surrounding the said aperture and extending outwardly and downwardly of the casing to a point below the level of the footplate;
  g. a gear wheel mounted within said casing and engaging said spur gear, said gear wheel being of such a width that it is permanently in mesh with the said spur gear during sliding movement of said spur gear along said drive shaft;
  h. further gear wheels within the casing forming with said gear wheel a compound gear train extending downwardly below the level of the footplate;
  i. means for transmitting torque from the lower end of the gear train to said two steerable wheels; and
  j. a passageway extending through the said housing longitudinally of the tractor for passage of a linkage (e.g. a brake linkage).

* * * * *